(12) United States Patent
Shindo

(10) Patent No.: US 9,786,918 B2
(45) Date of Patent: Oct. 10, 2017

(54) NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Yohei Shindo, Toyoto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/840,867

(22) Filed: Aug. 31, 2015

(65) Prior Publication Data

US 2016/0079602 A1 Mar. 17, 2016

(30) Foreign Application Priority Data

Sep. 16, 2014 (JP) .................................. 2014-188013

(51) Int. Cl.
*H01M 4/62* (2006.01)
*H01M 10/05* (2010.01)

(52) U.S. Cl.
CPC ........... *H01M 4/624* (2013.01); *H01M 4/625* (2013.01); *H01M 10/05* (2013.01); *Y02E 60/122* (2013.01)

(58) Field of Classification Search
CPC ...... H01M 4/624; H01M 4/625; H01M 10/05; Y02E 60/122
See application file for complete search history.

(56) References Cited

U.S. PATENT DOCUMENTS

| 2003/0113624 | A1 | 6/2003 | Kim et al. |
| 2008/0020283 | A1 | 1/2008 | Miyashiro et al. |
| 2011/0165457 | A1 | 7/2011 | Prochazka, Jr. et al. |
| 2013/0266847 | A1 | 10/2013 | Noguchi et al. |
| 2015/0037668 | A1* | 2/2015 | Iwaya ............... H01M 10/0525 429/200 |
| 2015/0093638 | A1* | 4/2015 | Shiozaki ............... H01M 4/628 429/212 |

FOREIGN PATENT DOCUMENTS

| JP | 2003-157892 A | 5/2003 |
| JP | 2003-197196 A | 7/2003 |
| JP | 3589021 B2 | 11/2004 |
| JP | 2012-503278 A | 2/2012 |
| JP | 2012-160435 A | 8/2012 |
| WO | 2006/018921 A1 | 2/2006 |
| WO | 2012/077712 A1 | 6/2012 |

* cited by examiner

*Primary Examiner* — Laura Weiner
(74) *Attorney, Agent, or Firm* — Oliff PLC

(57) ABSTRACT

A non-aqueous electrolyte secondary battery in which it is possible to increase a capacity retention rate is provided.
A non-aqueous electrolyte secondary battery is provided which includes: a positive electrode layer that includes a positive electrode active material and a conductive material; a negative electrode layer; and a non-aqueous electrolytic solution that is arranged between the positive electrode layer and the negative electrode layer, where an upper limit voltage is equal to or more than 4.5 V with respect to the oxidation-reduction potential of lithium, and the surface of the conductive material is coated with a coating layer mainly formed of P, O, C and H.

3 Claims, 4 Drawing Sheets

NON-AQUEOUS ELECTROLYTE SECONDARY BATTERY

TECHNICAL FIELD

The present invention relates to a secondary battery that uses a substance other than water as an electrolyte (hereinafter also referred to as a "non-aqueous electrolyte secondary battery").

BACKGROUND ART

In terms of, for example, increasing the energy density of a secondary battery, research and development are performed on a high-voltage type non-aqueous electrolyte secondary battery whose operation voltage is increased. As an electrolyte that can be used in the high-voltage type non-aqueous electrolyte secondary battery, for example, a liquid electrolyte that contains a support salt (non-aqueous electrolyte, hereinafter also referred simply to as an "electrolyte") is known.

As a technology on the non-aqueous electrolyte secondary battery described above, for example, Patent Literature 1 discloses an organic electrolyte battery in which an organic electrolyte is interposed between a positive electrode material and a negative electrode material, and in which at least a part of the surface of the positive electrode active material particles of the positive electrode is coated with an adhesion substance which is not easily oxidized even by the supply of oxygen from the positive electrode active material and which has ion conductivity and electron conductivity. Paragraph [0045] of the specification in Patent Literature 1 describes an example where a mixture of $LiNi_{0.5}Mn_{1.5}O_4$ and $Li_3PO_4$, a conductive material and an ion conductive binder are put into a solvent and are agitated, and are thereafter applied on a collector and are dried and then the positive electrode is produced. Patent Literature 2 discloses a lithium-ion secondary battery that uses an electrolytic solution containing a non-aqueous solvent, a support salt and an SEI formation material. Paragraph [0024] of the specification in Patent Literature 2 discloses $LiNi_{0.5}Mn_{1.5}O_4$ as an example of the positive electrode active material preferably used, and paragraph [0043] discloses that the surface of the positive electrode active material particles is coated with $Li_3PO_4$. Patent Literature 3 discloses a lithium battery that includes a cathode electrode containing a porous conductive material whose surface is coated with a sulfa and/or a sulfa-containing organic compound.

CITATION LIST

Patent Literature

Patent Literature 1: International Publication Pamphlet No. 2006/018921
Patent Literature 2: Japanese Unexamined Patent Application Publication No. 2012-160435
Patent Literature 3: Japanese Unexamined Patent Application Publication No. 2003-197196

SUMMARY OF INVENTION

Technical Problem

Disadvantageously, in the battery disclosed in Patent Literature 1, a ratio of a discharge capacity after charging and discharging are repeatedly performed on a discharge capacity before the charging and discharging are repeatedly performed (hereinafter also referred to as a "capacity retention rate") is low. This is presumed to occur due to the following mechanism. Specifically, the electrolytic solution is adhered to the conductive material whose potential is equal to that of the positive electrode active material (high potential) by bringing the positive electrode active material and the conductive material into contact, the electrolytic solution is decomposed on the surface of the conductive material and thus hydrogen fluoride is produced. The hydrogen fluoride produced as described above reacts with the positive electrode active material, and thus metal is eluted from the positive electrode active material, with the result that the capacity retention rate is lowered. It is difficult to solve the decrease in the capacity retention rate even by combining the technologies disclosed in Patent Literatures 1 to 3.

Hence, an object of the present invention is to provide a non-aqueous electrolyte secondary battery that can increase its capacity retention rate.

Solution to Problem

As a result of thorough studies, the present inventor has found that a conductive material whose surface is coated with a layer mainly formed of P, O, C and H is used as a positive electrode together with a positive electrode active material, and thus the capacity retention rate of a non-aqueous electrolyte secondary battery can be increased. The present invention has been completed based on the findings.

In order to solve the problem described above, the present invention has the following means.

Specifically, according to the present invention, there is provided a non-aqueous electrolyte secondary battery including: a positive electrode layer that includes a positive electrode active material and a conductive material; a negative electrode layer; and a non-aqueous electrolytic solution that is arranged between the positive electrode layer and the negative electrode layer, where an upper limit voltage is equal to or more than 4.5 V with respect to an oxidation-reduction potential of lithium, and the surface of the conductive material is coated with a coating layer mainly formed of P, O, C and H.

Here, the "upper limit voltage is equal to or more than 4.5 V with respect to the oxidation-reduction potential of lithium" refers to the fact that the voltage of the battery when the charging is completed is equal to or more than 4.5 V with respect to the oxidation-reduction potential of lithium. In the present invention, the "coating layer mainly formed of P, O, C and H" refers to the fact that the coating layer does not contain Li and that the total of the contents of P, O, C and H in the coating layer is 70 mass % or more.

Although in a potential region that is equal to or more than 4.5 V with respect to the oxidation-reduction potential of lithium, the electrolytic solution can be decomposed, the surface of the conductive material is coated with the coating layer described above, and thus it is possible to reduce the decomposition of the electrolytic solution, with the result that it is possible to increase the capacity retention rate. Hence, in the present invention, it is possible to provide a non-aqueous electrolyte secondary battery in which it is possible to increase the capacity retention rate.

In the present invention described above, the coating layer is preferably an amorphous layer. In such an embodiment, lithium ions are easily moved through the coating layer, and thus it is possible to easily increase the capacity retention rate.

Advantageous Effects of Invention

According to the present invention, it is possible to provide a non-aqueous electrolyte secondary battery in which it is possible to increase the capacity retention rate.

DESCRIPTION OF EMBODIMENTS

The present invention will be described below with reference to drawings. The following embodiments illustrate the present invention, and the present invention is not limited to the following embodiments. In the following description, "X to Y" means that it is no less than X and no more than Y unless otherwise particularly specified.

Figure 1:
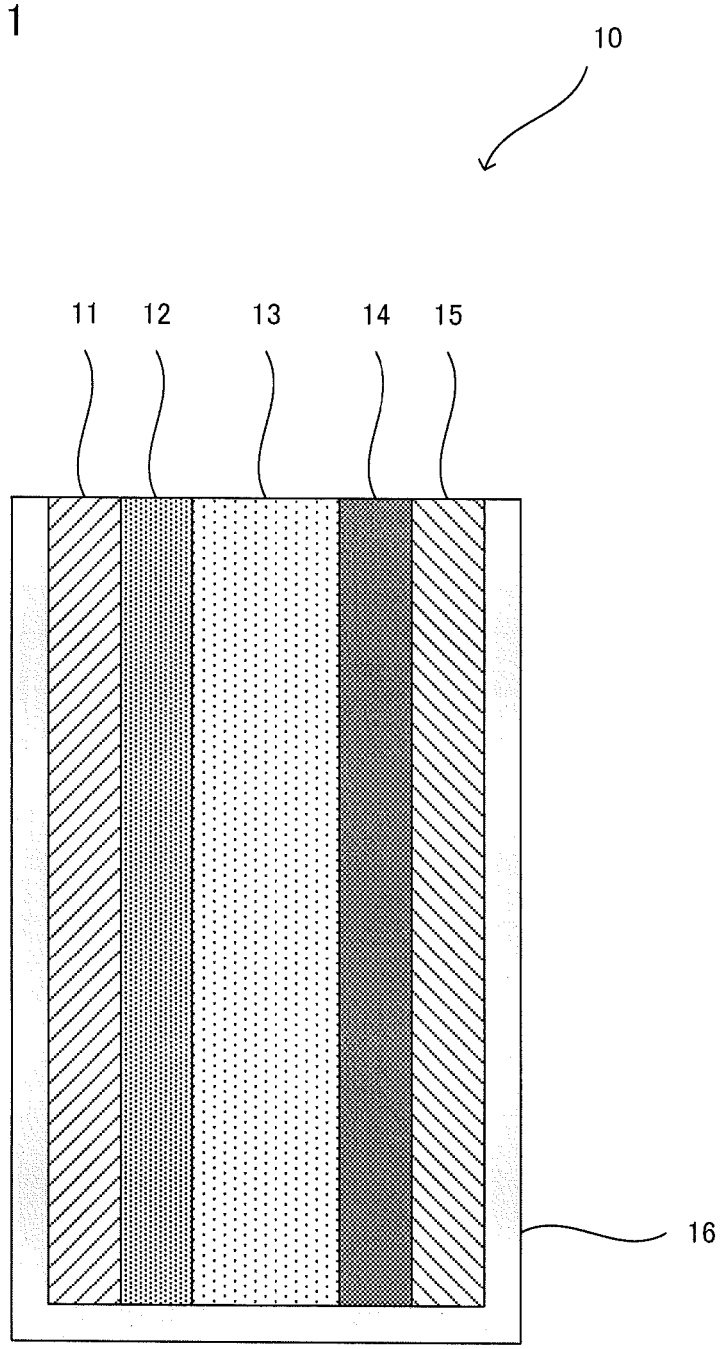
FIG. 1 is a diagram illustrating a non-aqueous electrolyte secondary battery of the present invention.

FIG. 1 is a diagram illustrating a non-aqueous electrolyte secondary battery 10 of the present invention (hereinafter referred to as a "battery of the present invention" or also referred simply to as a "battery"). In FIG. 1, a simplified diagram of the battery 10 is shown, and parts of a terminal, an exterior member and so on are omitted. The battery 10 shown in FIG. 1 includes a positive electrode collector 11, a positive electrode layer 12 connected to the positive electrode collector 11, a negative electrode collector 15, a negative electrode layer 14 connected to the negative electrode collector 15 and an electrolyte layer 13 provided between the positive electrode layer 12 and the negative electrode layer 14, and further includes an external member 16 that holds these components. At the time of charging, the battery 10 is charged so as to have 4.5 V or more with respect to the oxidation-reduction potential of lithium.

The positive electrode collector 11 is a conductive material that is connected to the positive electrode layer 12. As the positive electrode collector 11, a known metal that can be used as a collector on the positive electrode side of a lithium-ion secondary battery can be used. Examples of such a metal can include a metal material that contains one or two or more elements selected from a group consisting of Cu, Ni, Al, V, Au, Pt, Mg, Fe, Ti, Co, Cr, Zn, Ge and In. The shape of the positive electrode collector 11 is not particularly limited, and for example, a foil or the like that is formed of the metal material described above can be used.

The positive electrode layer 12 is a layer that contains at least a positive electrode active material and a conductive material. The positive electrode layer 12 can suitably contain, as necessary, not only these components but also a binder or the like.

The positive electrode active material contained in the positive electrode layer 12 can be formed in the shape of, for example, particles or a thin film. When the positive electrode active material is formed in the shape of particles, the average particle diameter ($D_{50}$) thereof, for example, is preferably no less than 1 nm and no more than 100 μm, and is more preferably no less than 10 nm and no more than 30 μm. The content of the positive electrode active material in the positive electrode layer 12 is not particularly limited but is, for example, preferably set no less than 40 mass % and no more 99 mass %.

Figure 2:
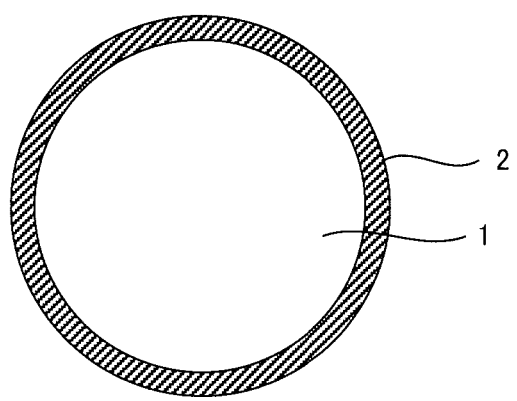
FIG. 2 is a diagram illustrating a coating layer with which a conductive material and its surface are coated.

At least a part of the surface of the conductive material contained in the positive electrode layer 12 is coated with a coating layer mainly formed of P, O, C and H. FIG. 2 shows a simplified diagram of an example of the form of the coating layer with which the conductive material capable of being used in the positive electrode layer 12 and its surface are coated. FIG. 2 is a diagram illustrating a cross section of the conductive material and the coating layer. In a conductive material 1 shown in FIG. 2, its surface is coated with a coating layer 2 mainly formed of P, O, C and H. The form described above is adopted, and thus it is possible to reduce the decomposition of an electrolytic solution on the surface of the conductive material 1. Here, the decomposition of the electrolytic solution is problematic in a potential region that is equal to or more than 4.5 V with respect to the oxidation-reduction potential of lithium. Although an upper limit voltage when the effect of the present invention is checked in Examples described later is 5.0 V with respect to the oxidation-reduction potential of lithium (=4.9 V with respect to counter electrode graphite), the potential region in these Examples where concern is given to the decomposition of the electrolytic solution is a potential region that is no less than 4.5 V and no more than 5.0 V with respect to the oxidation-reduction potential of lithium. Hence, when the upper limit voltage is equal to or more than 4.5 V with respect to the oxidation-reduction potential of lithium, it is possible to achieve the effect of the present invention that it is possible to increase a capacity retention rate by reducing the decomposition of the electrolytic solution.

Although in the present invention, the form of the coating layer 2 is not particularly limited, since a form for easily moving lithium ions is adopted to easily increase the capacity retention rate, the coating layer 2 is preferably an amorphous layer.

In the present invention, the thickness of the coating layer 2 is not particularly limited. However, in order for the coating layer 2 to be present on the surface of the conductive material 1, a lower limit value of the thickness of the coating layer 2 is set at 0.1 nm or more. On the other hand, when the thickness of the coating layer 2 is excessively large, the conductivity of lithium ions is more likely to be inhibited. Hence, since a form for easily moving lithium ions is adopted to easily increase the capacity retention rate, the upper limit value of the thickness of the coating layer 2 is preferably set at 5 nm or less. The thickness of the coating layer 2 preferably falls within a range of 0.1 nm and 5 nm.

A method of forming the coating layer 2 on the surface of the conductive material 1 is not particularly limited. For example, with a pulse laser deposition (PLD) method or a vapor phase method such as an atomic layer deposition (ALD) method, it is possible to form the coating layer 2 on the surface of the conductive material 1. Among these methods, with a vapor phase method such as an atomic layer deposition (ALD) method, the coating layer 2 is preferably formed. This is because the coating layer 2 having a uniform thickness is easily formed. In the present invention, at least a part of the surface of the conductive material 1 may be coated with the coating layer 2. However, in order for a form for easily reducing the decomposition of the electrolytic solution to be achieved, a proportion of the part coated with the coating layer 2 in the entire surface of the conductive material 1 is preferably maximized, and the entire surface of the conductive material 1 is particularly preferably coated with the coating layer 2 having a thin and uniform thickness.

Whether or not the surface of the conductive material 1 is coated with the coating layer 2 can be checked by, for example, XPS (X-ray Photoelectron Spectroscopy) or TOF-SIMS (Time of Flight Secondary Ion Mass Spectrometry). However, in the case of XPS, in order for a form capable of distinguishing the conductive material from the positive electrode active material to be achieved, an XPS device is used that can locally analyze an analysis region on the order of micrometers. On the other hand, in TOF-SIMS, the part of the conductive material is distinguished from that of the positive electrode active material, and thus it is possible to check, with an image, whether or not the coating layer is present in each of the parts. Hence, in order for a method of easily checking whether or not the coating layer 2 is present to be used, the checking is preferably performed by TOF-SIMS. When whether or not the coating layer 2 is present on the surface of the conductive material 1 is checked by TOF-SIMS, for example, the check is carried out in the following embodiments.

On the positive electrode, a TOF-SIMS analysis with importance placed on spatial resolution is performed in a range of several tens of micrometers, and thus it is possible to check, with an image, whether or not a coating layer containing P is present in the positive electrode active material portion and the conductive material portion. Examples of the component in the coating layer containing P detected by TOF-SIMS can include $PO^{3-}$, $PO^{2-}$, $PO^{-}$, $PF_2O^-$ and $CH_3PFO_3^-$ (fluoro-phosphoric acid ester). It is possible to check, based on the results of the detection, that the total of the contents of P, O, C and H is 70 mass % or more.

Examples of the conductive material 1 in the present invention can include carbon materials such as vapor-grown carbon fiber, acetylene black (AB), Ketjen black (KB), carbon nanotube (CNT) and carbon nanofiber (CNF) and metal materials that can withstand an environment when the non-aqueous electrolyte secondary battery is used.

Examples of the binder that can be contained in the positive electrode layer 12 can include acrylonitrile-butadiene rubber (ABR), butadiene rubber (BR), polyvinylidene fluoride (PVdF) and styrene-butadiene rubber (SBR).

When the positive electrode layer 12 is produced using a slurry positive electrode composition adjusted by dispersing, in a liquid, the positive electrode active material, the conductive material, the binder and the like, examples of the liquid that can be used can include heptane, and a nonpolar solvent can be preferably used. The thickness of the positive electrode layer 12 is preferably no less than 0.1 μm and no more than 1 mm, and is more preferably no less than 1 μm and no more than 100 μm.

The electrolyte layer 13 is a layer that is arranged between the positive electrode layer 12 and the negative electrode layer 14 and that includes at least a non-aqueous electrolytic solution. Through the non-aqueous electrolytic solution included in the electrolyte layer 13, metal ion conduction between the positive electrode active material and the negative electrode active material is performed. The non-aqueous electrolytic solution included in the electrolyte layer 13 is not particularly limited as long as it is a liquid electrolyte that does not contain water.

The non-aqueous electrolytic solution normally contains a support salt (lithium salt) and a non-aqueous solvent. Examples of the lithium salt serving as the support salt can include inorganic lithium salts such as $LiPF_6$, $LiBF_4$, $LiClO_4$ and $LiAsF_6$ and organic lithium salts such as $LiCF_3SO_3$, $LiN(CF_3SO_2)_2$, $LiN(C_2F_5SO_2)_2$ and $LiC(CF_3SO_2)_3$.

The non-aqueous solvent is not particularly limited as long as it dissolves the support salt described above. Examples of the high permittivity solvent can include cyclic esters (cyclic carbonates) such as ethylene carbonate (EC), propylene carbonate (PC) and butylene carbonate (BC), γ-butyrolactone, sulfolane, N-methyl-pyrrolidone (NMP) and 1,3-dimethyl-2-imidazolidinone (DMI). On the other hand, examples of the low viscosity solvent can include chain esters (chain carbonates) such as dimethyl carbonate (DMC), diethyl carbonate (DEC) and ethyl methyl carbonate (EMC), acetates such as methyl acetate and ethyl acetate and ethers such as 2-methyltetrahydrofuran. A mixture solvent in which the high permittivity solvent and the low viscosity solvent are mixed may be used.

The concentration of the support salt in the non-aqueous electrolytic solution preferably falls within a range of, for example, 0.3 to 5.0 mol/L and more preferably falls within a range of, for example, 0.8 to 1.5 mol/L. This is because when the concentration of the support salt is excessive low, the capacity at the time of high rate may be lowered whereas when the concentration of the support salt is excessively high, the viscosity may be increased, and thus the capacity may be lowered at a low temperature. In the present invention, as the non-aqueous electrolytic solution, a low volatile liquid such as an ionic liquid may be used.

Although the thickness of the electrolyte layer 13 significantly differs depending on the type of electrolyte and the configuration of the non-aqueous electrolyte battery, it falls within a range of, for example, 0.1 to 1000 μm, and preferably falls, among them, within a range of 0.1 to 300 μm.

The electrolyte layer 13 may further include a separator. This is because it is possible to obtain a highly safe battery. The separator is not particularly limited as long as it is formed with a porous film, and the separator may be formed of an organic material or an inorganic material. Specific examples thereof can include single-layer separators such as polypropylene (PP) and polyethylene (PE) and multilayer separators such as PP/PE/PP.

The negative electrode layer 14 is a layer that contains at least a negative electrode active material. In the negative electrode layer 14, not only the negative electrode active material but also a conductive material, a binder and the like can be suitably contained as necessary.

As the negative electrode active material that can be contained in the negative electrode layer 14, a negative electrode active material that can occlude and discharge lithium ions can be suitably used. Examples of the negative electrode active material can include a carbon active material, an oxide active material and a metal active material. The carbon active material is not particularly limited as long as it contains carbon. Examples thereof include graphite, mesocarbon microbeads (MCMB), highly oriented graphite (HOPG), hard carbon and soft carbon. Examples of the oxide active material can include $Nb_2O_5$, $Li_4Ti_5O_{12}$ and SiO. Examples of the metal active material can include In, Al, Si and Sn. As the negative electrode active material, a lithium-containing metal active material may be used. The lithium-containing metal active material is not particularly limited as long as it is an active material that contains at least Li, and the lithium-containing metal active material may be a Li metal or a Li alloy. Examples of the Li alloy can include an alloy that contains, for example, Li and at least one type of In, Al, Si and Sn. The negative electrode active material can be formed in the shape of, for example, particles or a thin film. When the negative electrode active material is formed in the shape of particles, the average particle diameter ($D_{50}$) thereof, for example, is preferably no less than 1 nm and no more than 100 μm, and is more preferably no less than 10 nm and no more than 30 μm. The content of the negative electrode active material in the negative electrode layer 14 is not particularly limited but is, for example, preferably set no less than 40 mass % and no more than 99 mass %.

Examples of the conductive material that can be contained in the negative electrode layer 14 can include the conductive material that can be contained in the positive electrode layer 12. Examples of the binder that can be contained in the negative electrode layer 14 can include the binder that can be contained in the positive electrode layer 12.

When the negative electrode layer 14 is produced using a slurry negative electrode composition adjusted by dispersing the negative electrode active material in a liquid, examples of the liquid that disperses the negative electrode active material and the like can include heptane, and a nonpolar solvent can be preferably used. The thickness of the negative electrode layer 14 is preferably no less than 0.1 μm and no more than 1 mm, and is more preferably no less than 1 μm and no more than 100 μm.

The negative electrode collector 15 is a conductive material that is connected to the negative electrode layer 14. As the negative electrode collector 15, a metal that can be used as a collector on the negative electrode side of a lithium-ion secondary battery can be used. Examples of such a metal can include a metal material that contains one or two or more elements selected from a group consisting of Cu, Ni, Al, V, Au, Pt, Mg, Fe, Ti, Co, Cr, Zn, Ge and In. The shape of the negative electrode collector 15 is not particularly limited, and for example, a foil or the like that is formed of the metal material described above can be used.

The battery 10 is used while being held in the external member 16. As the external member 16, an external member that can be used in a lithium-ion secondary battery can be used. Examples of the material that can constitute the external member can include metal materials such as aluminum and stainless steel and resin materials such as a polyphenylene sulfide resin or a polyimide resin. Among then, in order for an external member for easily enhancing heat discharge and increasing the energy density to be used, for example, metal materials such as aluminum and an aluminum alloy are preferably used. The shape of the external member is not particularly limited, and the external member can be formed in, for example, a circular shape (a cylindrical shape, a coin shape or a button shape), a hexahedral shape (a rectangular solid shape or a cube shape), a bag shape or a shape obtained by processing and deforming them.

The battery 10 can be produced in, for example, the following process. For example, the positive electrode layer 12 can be produced by applying to the surface of the positive electrode collector 11 the slurry positive electrode composition described above and performing drying and thereafter performing pressing as necessary. For example, the negative electrode layer 14 can be produced by applying to the surface of the negative electrode collector 15 the slurry negative electrode composition described above and performing drying and thereafter performing pressing as necessary. With the positive electrode layer 12 and the negative electrode layer 14 produced as described above, a multilayer member in which the positive electrode layer 12, a porous resin and the negative electrode layer 14 are arranged so as to sandwich the porous resin that functions as the separator is formed, thereafter the multilayer member is put into the external member 16 and furthermore the non-aqueous electrolytic solution produced by dissolving the support salt in a mixing medium of EC and EMC is injected into the external member 16, with the result that it is possible to arrange the electrolyte layer 13 between the positive electrode layer 12 and the negative electrode layer 14. Thereafter, while vacuuming is being performed as necessary, the opening portion of the external member 16 is heat welded, the external member 16 is hermetically sealed and thus it is possible to produce the battery 10.

As described above, in the battery 10, the conductive material 1 whose surface is coated with the coating layer 2 is used as the positive electrode layer 12. Here, since in general, the conductive material used as the positive electrode layer of the non-aqueous electrolyte secondary battery has a high specific surface area, it can be thought that the decomposition of the electrolytic solution in a high voltage battery whose upper limit voltage is equal to or more than 4.5 V with respect to the oxidation-reduction potential of lithium more often occurs on the surface of the conductive material. In the battery 10, since the conductive material 1 whose surface is coated with the coating layer 2 is used as the positive electrode layer 12, it is possible to reduce the decomposition of the electrolytic solution on the surface of the conductive material 1, with the result that it is possible to increase the capacity retention rate. Hence, in the present invention, it is possible to provide the non-aqueous electrolyte secondary battery 10 in which it is possible to increase the capacity retention rate.

Figure 3:
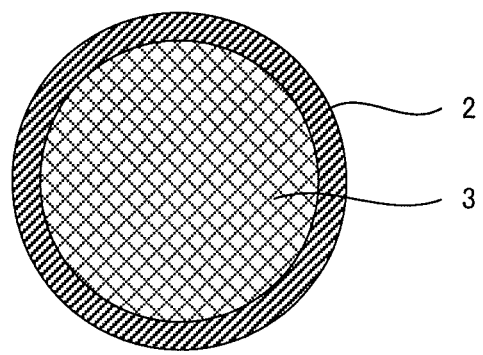
FIG. 3 is a diagram illustrating a coating layer with which a positive-electrode active material and its surface are coated.

Although in the above description on the present invention, the embodiment where the coating layer 2 is formed on the surface of the conductive material 1 included in the positive electrode layer 12 is illustrated, the present invention is not limited to such an embodiment. It can be thought that the decomposition of the electrolytic solution in a high voltage battery whose upper limit voltage is equal to or more than 4.5 V with respect to the oxidation-reduction potential of lithium occurs not only on the surface of the conductive material but also on the surface of the positive electrode active material. Hence, the non-aqueous electrolyte secondary battery of the present invention can have an embodiment where the coating layer is formed not only on the conductive material included in the positive electrode layer but also on the surface of the positive electrode active material, that is, an embodiment where the positive electrode active material on the surface of which the coating layer 2 is formed and the conductive material 1 on the surface of which the coating layer 2 is formed are included in the positive electrode layer 12. Such an embodiment is adopted, and thus it is possible to reduce the decomposition of the electrolytic solution on the positive electrode active material and the conductive material, with the result that it is easy to increase the capacity retention rate. FIG. 3 shows a positive electrode active material 3 on the surface of which the coating layer 2 is formed. It can be thought that even when without use of the conductive material 1 on the surface of which the coating layer 2 is formed, the positive electrode active material on the surface of which the coating layer 2 is formed is used, it is possible to reduce the elution of the metal from the positive electrode active material. However, in the non-aqueous electrolyte secondary battery of the present invention, since its potential when the charging is completed is equal to or more than 4.5 V with respect to the oxidation-reduction potential of lithium, concern is given to the decomposition of the electrolytic solution on the surface of the conductive material 1. Hence, in the present invention, in order for the decomposition of the electrolytic solution on the surface of the conductive material 1 to be reduced, the embodiment is necessary that the surface of the conductive material 1 is coated with the coating layer 2.

EXAMPLES

The present invention will be further described with reference to examples.

(1) Production of Battery

Example 1

Coating of Active Material with ALD

On the surface of $LiNi_{0.5}Mn_{1.5}O_4$, which is a positive electrode active material, a coating layer was formed as a film by an ALD method. When the film was formed by the ALD, as a P raw material, trimethyl phosphate (made by Wako Pure Chemical Industries, Ltd.) was used, and as an oxygen source, water was used. The temperature of the trimethyl phosphate was set at 100° C., the temperature of the water was set at 20° C. and the temperature of a reactive layer was set at 300° C. As a carrier gas, a nitrogen gas was used, the film formation was repeated 100 cycles and thus a coating layer mainly formed of P, O, C and H was formed on the surface of $LiNi_{0.5}Mn_{1.5}O_4$. It can be thought from the conditions in which the film formation was performed by the ALD that the thickness of the coating layer was about 1 nm and that the coating layer was amorphous. It can also be thought from the raw material of the film formation by the ALD that in the coating layer formed as the film, the total of the contents of P, O, C and H was 70 mass % or more.

Coating of Conductive Material with ALD

Except that instead of $LiNi_{0.5}Mn_{1.5}O_4$, acetylene black (made by Denki Kagaku Kogyo Kabushiki Kaisha), which was a conductive material, was used, under the same conditions as the active material coating described above, a coating layer mainly formed of P, O, C and H was formed on the surface of the acetylene black. It can be thought from the conditions in which the film formation was performed by the ALD that the thickness of the coating layer was about 1 nm and that the coating layer was amorphous. It can also be thought from the raw material of the film formation by the ALD that in the coating layer formed as the film, the total of the contents of P, O, C and H was 70 mass % or more.

Production of Positive Electrode Layer

The positive electrode active material ($LiNi_{0.5}Mn_{1.5}O_4$) on the surface of which the coating layer was formed and the conductive material (acetylene black) on the surface of which the coating layer was formed were mixed, and furthermore, a polyvinylidene fluoride (PVdF) binder dissolved in n-methyl pyrrolidone (NMP) was added, with the result that a slurry positive electrode composition was produced. The mixing ratio of the positive electrode active material, the conductive material and the binder when the positive electrode composition was produced was set such that in a weight ratio, the positive electrode active material:the conductive material:the binder=85:10:5. The obtained slurry positive electrode composition was applied by a doctor blade method to the surface of an Al foil (thickness of 15 μm) serving as the positive electrode collector, and was then dried in air at about 80° C., with the result that the NMP was removed. Thereafter, vacuum drying was performed at 120° C. for 10 hours. Then, the positive electrode layer was crimped to the positive electrode collector by pressing, and thus an applied test electrode (positive electrode) was produced. The electrode area formed on a circular electrode having a diameter of 1.5 cm was 1.77 $cm^2$.

Production of Non-Aqueous Electrolyte Secondary Battery

The positive electrode produced as described above was used, a graphite negative electrode was used as a negative electrode layer, a non-aqueous electrolytic solution in which lithium hexafluorophosphate ($LiPF_6$) serving as a support salt was dissolved in a mixing solvent where EC and EMC were mixed in a volume ratio of EC:EMC=3:7 was further used so as to have a concentration of 1 mol/$dm^3$ and aluminum was used as an external member, with the result that a bipolar coin cell of CR2032 type (the battery of Example 1) was produced. As the separator, a separator was used which contained PE and PP, which had a multilayer structure and which had a thickness of 20 μm.

Example 2

The battery of Example 2 was produced in the same manner as in Example 1 described above except that a positive electrode active material ($LiNi_{0.5}Mn_{1.5}O_4$) on the surface of which the coating layer was not formed was used.

Comparative Example 1

The battery of Comparative Example 1 was produced in the same manner as in Example 1 described above except that a positive electrode active material ($LiNi_{0.5}Mn_{1.5}O_4$) on the surface of which the coating layer was not formed and a conductive material (acetylene black) on the surface of which the coating layer was not formed were used.

Comparative Example 2

The battery of Comparative Example 2 was produced in the same manner as in Example 1 described above except that a conductive material (acetylene black) on the surface of which the coating layer was not formed was used.

(2) Charging and Discharging Test

When it was assumed that the test electrode was a positive electrode and that a metal Li was a negative electrode, a process for desorbing lithium ions from the test electrode was referred to as "charging" and a process for inserting lithium ions into the test electrode was referred to as "discharging", and measurements were performed on the battery of Example 1, the battery of Example 2, the battery of Comparative Example 1 and the battery of Comparative Example 2 described above. As a measuring device, a charging and discharging test device (HJ-1001 SM8A made by Hokuto Denko Corporation) was used. The measurement conditions were set such that a current value in the first cycle was 0.2 mA/$cm^2$, a voltage when the discharging was completed was 3.5 V (counter electrode graphite), a voltage when the charging was completed was 4.9 V (counter electrode graphite) and the temperature was 25° C. The 1 C rate was calculated from the capacity of the measured cell. As conditioning, charging and discharging were performed three times at the 1 C rate. The discharging capacity in the third round of conditioning was assumed to be the "initial discharging capacity". Thereafter, charging was performed until the state of charge (SOC) reached 60%, the battery was left to stand still for 30 minutes, thereafter discharging was performed at 1, 3 and 5 C rates at 25° C. and the "initial resistance" was estimated from an overvoltage after 10 seconds. Thereafter, under conditions of 60° C., the 2 C rate, 3.5 V of a voltage when the discharging was completed (counter electrode graphite) and 4.9 V of a voltage when the charging was completed (counter electrode graphite), charging and discharging were performed 100 cycles. Then, after the completion of the charging and discharging in the 100th cycle, under conditions of 25° C., the 1 C rate, 3.5 V of a voltage when the discharging was completed (counter electrode graphite) and 4.9 V of a voltage when the charging was completed (counter electrode graphite), charging and discharging were performed, and the discharge capacity at that time was assumed to be the "discharging capacity after the cycle test".

(3) Results

Figure 4:
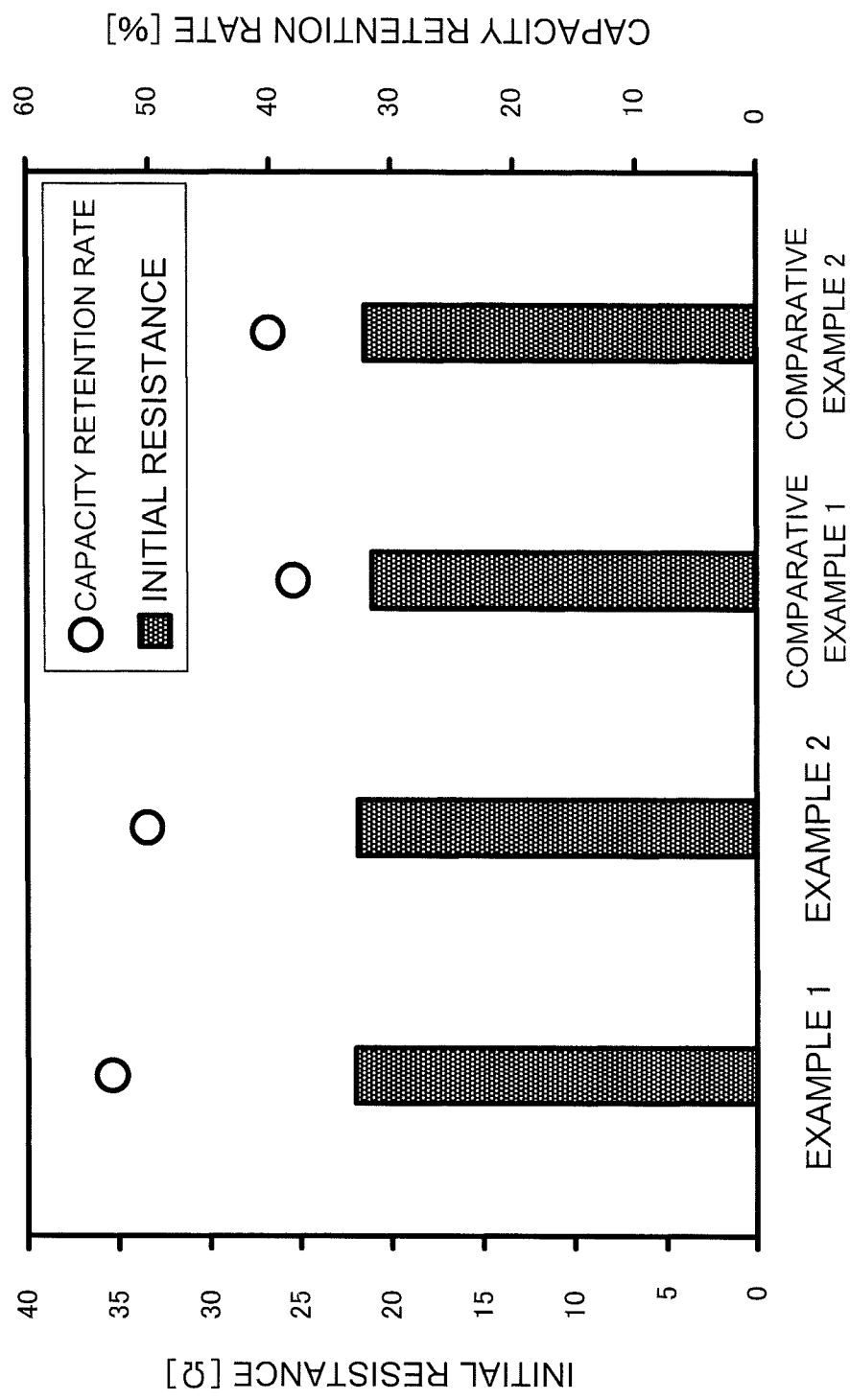
FIG. 4 is a diagram illustrating the results of capacity retention rates and initial resistances.

The "initial discharging capacity" and the "discharging capacity after the cycle test" specified by the charging and discharging test described above were substituted into a formula of capacity retention rate (%)=100×discharging capacity after cycle test/initial discharging capacity, and thus the capacity retention rates of the battery of Example 1, the battery of Example 2, the battery of Comparative Example 1 and the battery of Comparative Example 2 were calculated. The results are shown in FIG. 4. The initial resistances of the battery of Example 1, the battery of Example 2, the battery of Comparative Example 1 and the battery of Comparative Example 2 are shown in FIG. 4. In FIG. 4, the individual points are the results of the capacity retention rates, and the individual bar graphs are the results of the initial resistances.

As shown in FIG. 4, although in the battery of Example 1 and the battery of Example 2 corresponding to the non-aqueous electrolyte secondary battery of the present invention, the capacity retention rates were 50% or more, in the battery of Comparative Example 1 and the battery of Comparative Example 2, the capacity retention rates were about 40%. Here, in the battery of Example 2 and the battery of Comparative Example 1, the coating layer was not formed on the surface of the positive electrode active material, and they differ only in whether or not the coating layer was formed on the surface of the conductive material. When the battery of Example 2 was compared with the battery of Comparative Example 1, the capacity retention rate of the battery of Example 2 using the conductive material on the surface of which the coating layer was formed was higher than that of the battery of Comparative Example 1 using the conductive material on the surface of which the coating layer was not formed. It is found from these results that the conductive material whose surface is coated with the coating layer mainly formed of P, O, C and H is used, and thus it is possible to increase the capacity retention rate of the non-aqueous electrolyte secondary battery whose upper limit voltage is equal to or more than 4.5 V with respect to the oxidation-reduction potential of lithium.

In the battery of Example 1 and the battery of Comparative Example 2, the positive electrode active materials on the surfaces of which the coating layer 2 was formed, and they differ only in whether or not the coating layer was formed on the surface of the conductive material. When the battery of Example 1 was compared with the battery of Comparative Example 2, the capacity retention rate of the battery of Example 1 using the conductive material on the surface of which the coating layer was formed was higher than that of the battery of Comparative Example 2 using the conductive material on the surface of which the coating layer was not formed. It is also found from these results that the conductive material whose surface is coated with the coating layer mainly formed of P, O, C and H is used, and thus it is possible to increase the capacity retention rate of the non-aqueous electrolyte secondary battery whose upper limit voltage is equal to or more than 4.5 V with respect to the oxidation-reduction potential of lithium.

When the battery of Example 1 was compared with the battery of Example 2, the capacity retention rate of the battery of Example 1 was higher. Hence, it is found that not only the conductive material whose surface is coated with the coating layer mainly formed of P, O, C and H but also the positive electrode active material whose surface is coated with the coating layer mainly formed of P, O, C and H is used, and thus it is possible to easily increase the capacity retention rate of the non-aqueous electrolyte secondary battery whose upper limit voltage is equal to or more than 4.5 V with respect to the oxidation-reduction potential of lithium.

When the results of the initial resistances of the battery of Example 1, the battery of Example 2, the battery of Comparative Example 1 and the battery of Comparative Example 2 were compared, regardless of whether or not the coating layer 2 was present, the values of the initial resistances were about equal to each other (about 21 to 22Ω). In other words, according to the non-aqueous electrolyte secondary battery of the present invention, it is possible to increase the capacity retention rate while reducing an increase in resistance.

REFERENCE SIGNS LIST 1 conductive material
2 coating layer
3 positive electrode active material
10 non-aqueous electrolyte secondary battery
11 positive electrode collector
12 positive electrode layer
13 electrolyte layer
14 negative electrode layer
15 negative electrode collector
16 external member

The invention claimed is:

1. A non-aqueous electrolyte secondary battery comprising:
a positive electrode layer that includes a positive electrode active material and a conductive material;
a negative electrode layer; and
a non-aqueous electrolytic solution that is arranged between the positive electrode layer and the negative electrode layer,
wherein an upper limit voltage is 4.5 V to 5.0 V with respect to an oxidation-reduction potential of lithium,
a surface of the conductive material is coated with a coating layer mainly formed of P, O, C and H,
the coating layer is 0.1 nm to 5 nm in thickness,
the coating layer is an amorphous layer, and
the coating layer includes $PO^{3-}$, $PO^{2-}$, $PO^-$, $PF_2O^-$ and $CH_3PFO_3^-$ as a component detected by Time of Flight Secondary Ion Mass Spectrometry.

2. The non-aqueous electrolyte secondary battery according to claim 1,
wherein the coating layer is formed as a film over the surface of the conductive material with a vapor phase method.

3. The non-aqueous electrolyte secondary battery according to claim 1, wherein an entire surface of the conductive material is coated with the coating layer.

* * * * *